Patented Nov. 14, 1939

2,179,616

UNITED STATES PATENT OFFICE 2,179,616

PROCESS OF PRODUCING A BACON RIND FOOD PRODUCT

George A. Darrow, Los Angeles, Calif.

No Drawing. Application November 2, 1938, Serial No. 238,397

5 Claims. (Cl. 53—21)

This invention relates to a method of treating bacon rind to form a product suitable for human consumption.

An object of the invention is to provide a method of forming a highly palatable food product from the rinds of bacon slabs, particularly that form of bacon rind from which fat has been removed in the operation of stripping bacon for the production of sliced bacon in the packing house; the rind as removed from a bacon slab being usually approximately nine inches wide and twenty-four inches in length with a thickness of about one-eighth inch and being practically free of surface fat but containing considerable incorporated fat in its cell structure.

In carrying out the invention the bacon rind is initially cut into short narrow strips of approximately one-fourth inch in width and one and one-half inches in length, and the resultant small particles or strips are placed in a wire mesh basket, which with its rind content is placed in a suitable water containing steam cooker embodying a hermetically sealed container. The rind pieces are subjected to a steam pressure in the cooker of approximately twenty pounds at a temperature of about 259 degrees Fahrenheit; the rind being subjected to such pressure and temperature for approximately thirty minutes and then being removed from the container and spread out on a surface and allowed to cool. There being a tendency for the rind to form into a gelatinous mass under the action of pressure and temperature some care should be exercised in not subjecting the rind to a pressure and temperature for such length of time as to convert it into a jell. The heat and pressure treatment is accordingly discontinued before the gelatinous stage is reached.

This steam cooking of the rind effects substantially complete removal of fat associated therewith resulting in a lard which is recovered from the cooker.

The rind particles on being removed from the container will have substantially their original elongated shape but will be shrunk to approximately one half their original size, and free of fat.

The pieces of rind are then allowed to cool after which they are placed in an enclosed wire basket of small mesh and are then completely submerged in a hot oil or fat having a temperature of approximately 350 degrees Fahrenheit; the rind particles being thus cooked in the oil or fat until the cells of the rind explode on the occurrence of which the rind particles will be puffed up and will float to the surface of the liquid. To effect this action at the temperature specified requires cooking for a period of from two to three and one-half minutes but in some instances a longer period of cooking may be required.

In thus cooking the rind particles various oils or fats may be employed but I have found that vegetable oil produces a more satisfactory and tasty product and one that is dry, whereas use of animal fat such as lard will render the product greasy.

At the conclusion of the cooking operation as above stated the exploded puffed particles of rind will be enlarged to about four times their original size.

It is quite important that the cooking operation be effected with the rind particles completely submerged in the hot liquid, otherwise the puffed rind particles on coming in contact with atmosphere will shrivel back to normal size and will become gelatinous in character.

On completion of the cooking action the rind particles are removed from the cooking liquid and a portion of the liquid allowed to drain therefrom whereupon the particles are spread out on an absorbent paper to effect removal of excess oil therefrom by absorption. The product is then salted after which it is ready for packaging.

The resultant product is crisp and substantially free from oil or fat and is readily edible. It is characterized by a mild flavor of bacon.

While I have specifically recited definite steps for the production of the product, such are given by way of example to enable persons skilled in the art to carry the invention into effect, but it will be manifest that the steps may be varied especially as to the time and temperature elements, and yet produce a satisfactory product, and accordingly the invention embraces such modifications as come within the purview of the appended claims.

I claim:

1. The process of forming an edible bacon rind product consisting in reducing a bacon rind to small particles, subjecting such particles to heat and pressure for such period of time as to effect shrinking thereof to approximately one-half the original size of the particles without jelling thereof, then subjecting the particles to a cooking action while submerged in a hot oil or fat until explosion of the cells of the rind occurs; then terminating the cooking action and allowing the product to dry.

2. The process of forming an edible bacon rind product consisting in reducing a bacon rind into small particles, subjecting such particles to heat and pressure for such period of time as to effect shrinking thereof to approximately one-half the original size of the particles without jelling thereof, subjecting the shrunk particles to a cooking action while submerged in a hot oil or fat until explosion of the cells of the rind occurs; then terminating the cooking action and allowing the particles to dry while effecting absorption of excessive oil or fat from the particles.

3. The process of producing an edible product from bacon rind consisting in reducing the rind to small strips, subjecting the resultant particles to a temperature of approximately 259 degrees Fahrenheit at approximately twenty pounds pressure for such period of time as to effect shrinking of the particles to approximately one-half their original size, then cooking the particles while submerged in an oil or fat at such temperature and for such period of time as to effect explosion of the cells of the rind particles, then removing excess oil or fat from the particles and allowing same to dry.

4. The process of making an edible product from bacon rind consisting in reducing the rind to small particles, shrinking the particles under the action of heat and pressure, then subjecting the particles to a cooking action while submerged in oil or fat at a temperature of approximately 350 degrees Fahrenheit for such period of time as to effect explosion of the cells of the rind, then draining and drying the resultant product.

5. The process of producing an edible product from bacon rind consisting in reducing the rind to small narrow strips, subjecting such strips to a temperature of approximately 259 degrees Fahrenheit under a pressure of approximately twenty pounds to effect shrinking of the strips to approximately one-half their original size; allowing the strips to cook, then subjecting the strips to a cooking action while submerged in an oil or fat at a temperature of approximately 350 degrees Fahrenheit for such length of time as to effect explosion of the cells of the rind and cause the exploded strips to float to the surface of the oil or fat, then draining the strips and effecting absorption of excess oil or fat therefrom while allowing the strips to dry.

GEORGE A. DARROW.